United States Patent [19]

Beese

[11] 4,436,218

[45] Mar. 13, 1984

[54] REVERSE BUCKLING BURSTING DISC

[75] Inventor: John G. Beese, Cardiff, England

[73] Assignee: IMI Marston Limited, Wolverhampton, England

[21] Appl. No.: 342,803

[22] Filed: Jan. 26, 1982

[30] Foreign Application Priority Data

Feb. 19, 1981 [GB] United Kingdom ................. 8105237

[51] Int. Cl.³ .............................................. F16K 17/40
[52] U.S. Cl. ................................. 220/89 A; 137/68 R
[58] Field of Search ................... 137/68 R; 220/89 A; 285/2, 3

[56] References Cited

U.S. PATENT DOCUMENTS 589,944  9/1897  Greengrass ...................... 220/89 A
3,667,644  6/1972  Fortmann ........................ 220/89 A Primary Examiner—Harold W. Weakley
Attorney, Agent, or Firm—Cushman, Darby & Cushman

[57] ABSTRACT

A reverse buckling disc having a central domed region, an outer flange and an integral transitional region interconnecting the flange and the domed central region wherein the included angle of the transitional region is greater than the included angle of the domed region, such that the reversing pressure of the disc is determined by the angle of the transitional region rather than by the height of the dome.

8 Claims, 8 Drawing Figures

REVERSE BUCKLING BURSTING DISC

BACKGROUND OF THE INVENTION

This invention relates to bursting discs and has particular reference to reverse buckling bursting discs.

Bursting discs are used to provide emergency venting for air lines, reactors, pressure vessels etc. They are normally designed to burst or relieve at a given pressure, and it is desirable that they should be capable of operating as close to their burst pressure as is possible without creeping or without suffering adverse fatigue failures. Basically, bursting discs can be classified into two types—first, those types in which the disc comprises a domed member surrounded by a flange in which the disc is disposed so as to present its concave side to the high pressure, and secondly discs of the same general shape in which the convex side is displayed to the high pressure.

The present invention is concerned with discs of the latter type which are sometimes referred to as reverse buckling discs. The reason for this is that in order that they may vent the discs need to reverse. In general, on reversal the discs can either become impaled upon cutting blades which cut the material of the discs and cause venting or the discs can be released from their holders so as to give complete venting of the aperture normally closed by the disc.

The present invention is concerned with reverse buckling discs suitable for both of the latter types of application.

SUMMARY OF THE INVENTION

By the present invention there is provided a reverse buckling pressure relief disc adapted to be disposed, in use, with its convex side towards the higher pressure encountered in use, the disc having a central domed region, an outer flange and an integral transitional region interconnecting the flange and the central domed region, the transitional region being of generally frusto-conical shape and having an included angle in the region of 170° to 70°, the included angle of the tangents of the domed region taken where the central domed region meets the transitional region is less than the said included angle of the transitional region.

Preferably, the included angle lies within the region of 160° to 120°. The ratio of the maximum diameter of the central domed region to the maximum diameter of the transitional region may be between 0.75:1 to 0.99:1. The ratio is preferably in the region 0.8:1 to 0.99:1, further preferably 0.9:1 to 0.99:1. The ratio of the overall internal domed height of the disc to the maximum diameter of the transitional region is preferably in the range of 0.025:1 0.2:1.

There may be provided knife blades to cut the disc upon reversal. Alternatively, the disc may be so mounted as to be pushed clear of the holder assembly upon reversal.

BRIEF DESCRIPTION OF THE DRAWINGS

By way of example embodiments of the present invention will now be described with reference to the accompanying drawings, of which.

DESCRIPTION OF THE PREFERRED EMBODIMENTS

Figure 1:
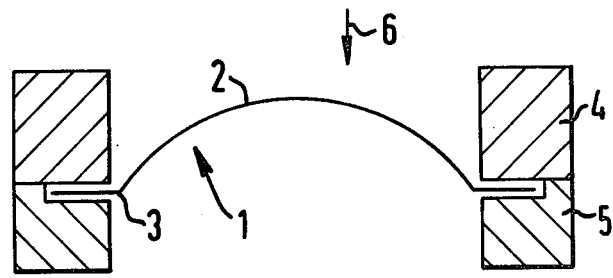
FIG. 1 is a schematic cross-sectional view of a standard reverse buckling diaphragm pressure relief disc.
Figure 1:
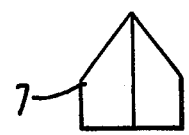

Referring to FIG. 1, a reverse buckling disc 1 has a central domed part-spherical region 2 and an outer peripheral flange 3. The flange is mounted between a pair of holder rings 4 and 5. The disc is, in use, pressurised in the direction of the arrow 6. The disc eventually relieves by reversing, and either impaling upon knife blades, indicated dotted as at 7, or the action of the pressure pushes it out of the holder rings 4 and 5.

Figure 2:
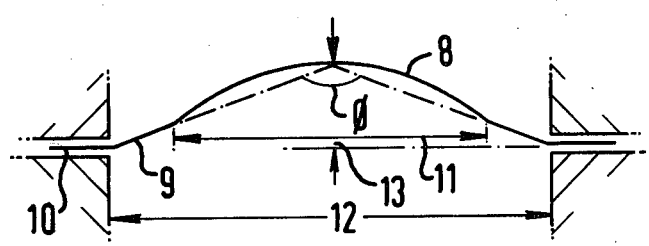
FIG. 2 is a schematic cross-sectional view of a disc in accordance with the present invention.

Referring to FIG. 2 this shows a disc in accordance with the present invention. The disc has a part-spherical domed central region 8 which is connected via a frusto-conical transitional region 9 to an integral flange 10. The included angle $\phi$ of the frusto-conical region is preferably in the range 160° to 120° and is further preferably 130°. The ratio of the maximum diameter 11 of the central domed portion to the maximum diameter 12 of the transitional portion is preferably in the region 0.9:1 and 0.99:1. The ratio of the height 13 of the disc to the maximum diameter 12 of the transitional region may lie in the range 0.025:1 to 0.2:1. It has been found that as the ratio of diameter 11 to diameter 12 approaches 1 and/or as $\phi$ becomes less than 120° the performance of the modified diaphragm arrangement of the invention approaches that of a standard reverse buckling diaphragm. It has also been found that as $\phi$ approaches 180° and/or the ratio of diameter 11 to diameter 12 approaches zero the performance on reversal does not have sufficient momentum to achieve full venting.

Figure 3:
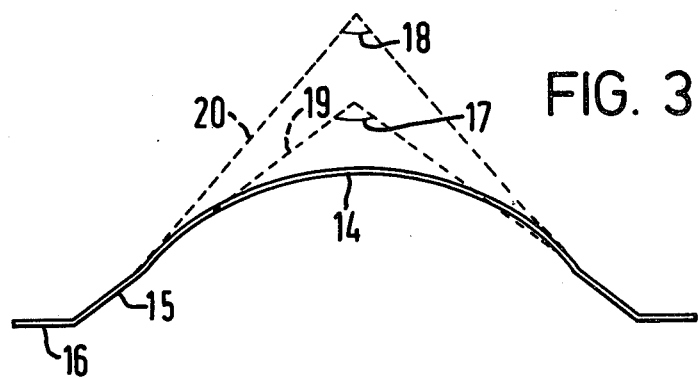
FIG. 3 is a schematic cross-sectional view of a further disc in accordance with the invention.
Figure 4:
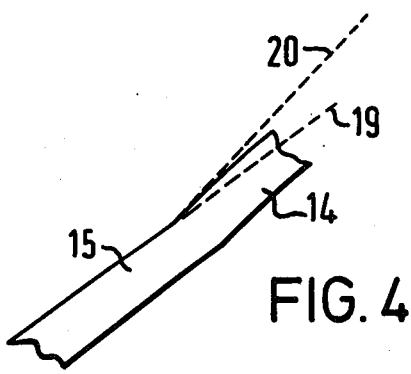
FIG. 4 is an enlarged view of a portion of the disc of FIG. 3.

Illustrated in FIGS. 3 and 4 is a bursting disc in accordance with the present invention in which the included angles are shown in more detail. It can be seen, from FIG. 3, that the disc comprises a central part-spherical domed portion 14 with an integral transitional portion 15 and an annular flange 16. The included angle 17 of the transitional region 15 can be seen to be greater than the included angle 18 of the domed portion 14 taken at the point where the tangents of the domed portion meet the transitional portion. The lines used to determine the included angles, namely lines 19 and 20, are shown more clearly in FIG. 4. From FIG. 4 it can be seen that the transitional region 15 is integral with the domed region 14 and the line 19 is a continuation of transitional region 15 whereas line 20 is a tangent to the domed portion 14 taken exactly where the domed portion meets the transitional portion.

Figure 5:
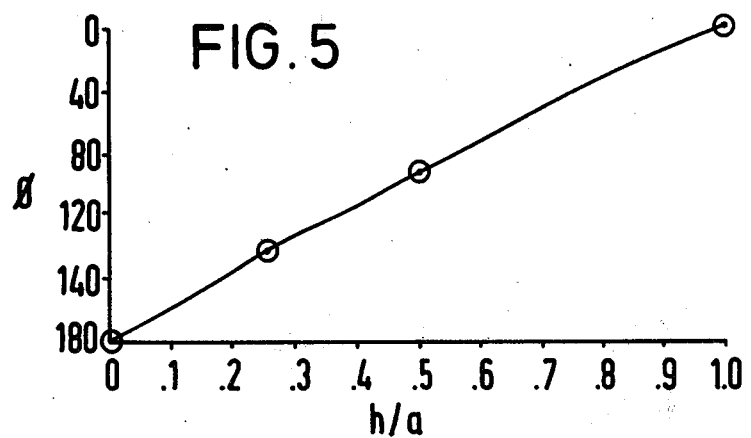
FIG. 5 is a graph of included angle $\phi$ against the ratio of dome height to chord radius.
Figure 6:
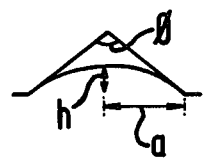
FIG. 6 is a schematic view of a disc.

It is a matter of experimental observation that the included angle $\phi$ is directly and inversely related to the ratio of the dome height h over the chord radius a, and the theoretical relationship is illustrated in FIG. 5. By way of explanation FIG. 6 shows the dome height h and chord radius a for a given angle $\phi$ of a simple domed disc. It is also a matter of practical observation that although the dome height ratio can in theory have any value between 0 and 1, in practice of ratio of h/a does not exceed approximately 0.6 for very ductile materials.

Practically, therefore, it has been observed that the minimum value for $\phi$ is of the order of 60°.

Figure 7:
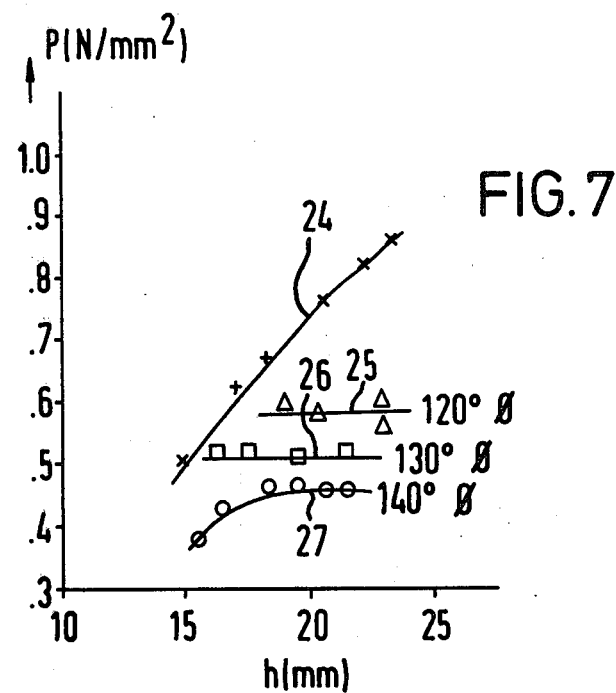
FIGS. 7 and 8 are graphs of pressure against dome height.
Figure 8:
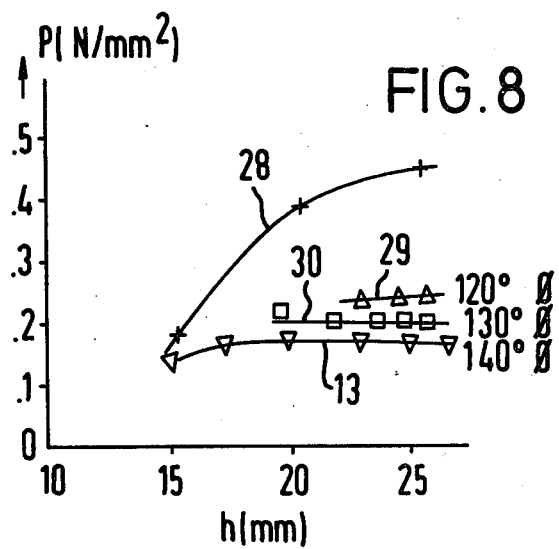

Referring to FIGS. 7 and 8 these show reverse buckling pressures p measured in N/mm² against dome height h in mm for stainless steel discs having a thickness of 0.4 mm in the case of FIG. 7 and 0.25 mm in the case of FIG. 8. In both cases the maximum diameter of the transitional region of the disc was determined to be 125 mm and the diameter of the domed portion was 120 mm.

In the case of a conventional domed disc having no transitional region the reverse buckling pressure is illustrated by line 24. A disc in accordance with the invention having an included angle for the transitional region of 120° has a reverse buckling pressure indicated by line 25. Similarly lines 26 and 27 illustrate reverse buckling pressures for included angles of 130° and 140°.

It can be seen similarly from FIG. 8 that the reverse buckling pressure for a conventional disc illustrated by line 28 increases as the dome height h of the disc increases. By comparison, however, the reverse buckling pressure for discs in accordance with the invention remain substantially constant for discs having included angles of 120°, 130° and 140° as illustrated by lines 29 to 31 respectively.

The importance of such an arrangement is that the flattening of the reverse buckling pressure against dome height means that the control of manufacture of the reverse buckling disc is much easier. As the controlling factor appears to be the included angle of the transitional region then the actual dome height is less significant. Thus manufacturing tolerances are wider than for discs of designs without the transitional region, because once the included angle of the dome becomes less than the included angle of the transitional region then the reverse buckling pressure has become substantially constant. It can also be appreciated that the use of the included angle enables the reverse buckling pressure to be reduced for a given dome height which means that advantage can be taken of this feature, or for a given reverse buckling pressure thicker material could be used.

The frusto-conical region may be straight in cross-section or alternatively may be curved. For production reasons straight sides may be preferred.

Venting usually requires either the disc striking against a sharp edge and splitting or pushing from its holder low reversal pressure utilising a low dome height does not produce sufficiently rapid movement or "drive" and hence venting is restricted. Obviously, however, other types of reverse buckling discs may be used with a shape in accordance with the present invention. Thus the disc may be used in conjunction with a cruciform knife blade or a three blade type in which the disc reverses onto the cruciform knife blade. Alternatively there may be provided a single edge cutter device in which the disc reverses onto the edge. The disc may be of the scored type and there may, in such circumstances, be no need to provide a cutting blade. The blow out disc may be welded into the holder or otherwise secured firmly into the holder. Preferably in the case of scored discs the scores are provided in the face remote from the pressure side. By the provision of the modified diaphragm geometry two extra advantages are obtained. As explained above for two discs of the same material of the same thickness fitting in the same holder and having the same dome height a lower reverse buckling pressure can be obtained. This means, for example, that if the reverse buckling pressure is fixed thicker material can be used and this gives better life under corrosive conditions.

Alternatively, a larger dome height can be used to obtain the same reverse buckling pressure. This will give a greater "drive," resulting in better venting. Therefore, the useful range of the reverse buckling diaphragm can be extended.

I claim:

1. A reverse buckling pressure relief disc adapted to be disposed, in use, with its convex side towards the higher pressure encountered in use, wherein the improvement comprising the disc having a central domed region, an outer flange and an integral transitional region interconnecting the flange and the central domed region, the transitional region being of generally frusto-conical shape and having an included angle in the region 170° to 70°, the included angle of the tangents of the domed region taken where the central domed region meets the transitional region being less than the said included angle of the transitional region.

2. A disc as claimed in claim 1 in which the included angle lies within the region of 160° to 140°.

3. A disc as claimed in claim 1 or claim 2 in which the ratio of the maximum diameter of the central domed region to the maximum diameter of the transitional region is between 0.75:1 to 0.99:1.

4. A disc as claimed in claim 3 in which the ratio is in a range chosen from the group 0.8:1 to 0.99:1 or 0.9:1 to 0.99:1.

5. A disc as claimed in claim 1 in which the ratio of the overall internal domed height of the disc to the maximum diameter of the transitional region is in the range 0.025:1 to 0.2:1.

6. A disc and holder assembly incorporating a disc as claimed in claim 1 together with a holder for said disc, in which there is further provided knife blades to cut the disc upon reversal.

7. A disc and holder incorporating a disc as claimed in claim 1 in which the disc is so mounted as to be pushed clear of the holder assembly upon reversal.

8. A disc and holder assembly as claimed in claim 7 wherein the disc is a continuous sheet of metal being without impressions or cuts formed in the surface of the metal.

* * * * *